(12) United States Patent
Chang et al.

(10) Patent No.: US 8,107,024 B2
(45) Date of Patent: Jan. 31, 2012

(54) THREE-DIMENSIONAL DISPLAY DEVICE

(75) Inventors: Jui-Tsung Chang, Miao-Li County (TW); Jia-Shyong Cheng, Miao-Li County (TW)

(73) Assignee: Chimei Innolux Corporation, Miao-Li County (TW)

( * ) Notice: Subject to any disclaimer, the term of this patent is extended or adjusted under 35 U.S.C. 154(b) by 316 days.

(21) Appl. No.: 12/589,494

(22) Filed: Oct. 23, 2009

(65) Prior Publication Data
US 2010/0103333 A1    Apr. 29, 2010

(30) Foreign Application Priority Data
Oct. 24, 2008    (CN) .......................... 2008 1 0216916

(51) Int. Cl.
*G02F 1/1335* (2006.01)
(52) U.S. Cl. .......................................... 349/15
(58) Field of Classification Search ............ 349/15
See application file for complete search history.

(56) References Cited

U.S. PATENT DOCUMENTS

| | | | |
|---|---|---|---|
| 6,554,430 B2 | 4/2003 | Dorval et al. | |
| 6,714,174 B2 * | 3/2004 | Suyama et al. | 345/32 |
| 7,059,729 B2 | 6/2006 | Hoshino et al. | |
| 7,355,658 B2 * | 4/2008 | Ioki et al. | 349/15 |
| 7,663,707 B2 * | 2/2010 | Kawakami et al. | 349/15 |

* cited by examiner

*Primary Examiner* — James Dudek
(74) *Attorney, Agent, or Firm* — Altis Law Group, Inc.

(57) ABSTRACT

An exemplary three-dimensional display device includes a flat panel display and a light regulating sheet positioned on the flat panel display. Light beams emitted from the flat panel display and input to the light regulating sheet are adjusted by the light regulating sheet and output from the light regulating sheet at predetermined angles relative to their input angles. The light regulating sheet includes at least one light regulating ring divided into a plurality of light regulating units. The flat panel display includes a plurality of display units corresponding to the plurality of light regulating units. Each display unit displays a two-dimensional image of an object viewed from a predetermined viewing angle position. Each light regulating unit limits the two-dimensional image to within a viewing angle range corresponding to the predetermined viewing angle position, and the two-dimensional images of the object displayed in the display units are different from each other.

20 Claims, 23 Drawing Sheets

THREE-DIMENSIONAL DISPLAY DEVICE

BACKGROUND

1. Technical Field

The disclosure relates to a three-dimensional display device that utilizes manipulation of light corresponding to two-dimensional (2D) images.

2. Description of Related Art

In an attempt to improve upon traditionally generated 2D images, innovations have been conceived to accurately represent our 3D environment via electronic display devices.

Referring to FIG. 23, a commonly used 3D display system 100 includes a projection screen 101, a projector 102, a memory 103 and a mirror 105. The projection screen 101 is capable of rotating at high speed. The memory 103 stores images of an object, each image being a photograph taken from one particular viewing angle position of a range of viewing angle positions around the object; i.e., the range from 0° to 360°. Each image corresponds to a particular rotation angle (orientation) of the projection screen 101, also in the range from 0° to 360°. The projector 102 projects the images one after another onto the mirror 105, which reflects the images onto the rotating projection screen 101.

In detail, when the 3D display system 100 displays a representation of the object, the projection screen 101 rotates at high speed to become nearly invisible. During such rotation, when the projection screen 101 reaches a position (angular orientation) perpendicular to a given viewing angle of the object stored in the memory 103, the projector 102 projects the image corresponding to that viewing angle position onto the projection screen 101 via the mirror 105. When the projection screen 101 reaches a next adjacent position (angular orientation), such position is perpendicular to a next adjacent viewing angle of the object stored in the memory 103, and the projector 102 projects the image corresponding to that next adjacent viewing angle position onto the projection screen 101 via the mirror 105. Thus as the projection screen 101 continues to rotate, a series of images of the object are displayed on the projection screen 101 in quick succession. Very fast rotation of the projection screen 101, together with the projector 102 presenting the series of images in very fast succession, enable the image to appear to be a 3D image as seen by a human viewer.

However, a high performance motor is required to rotate the projection screen 101 at high speed, increasing costs and power consumption. In addition, in order that the projector 102 be one that is capable of switching images at the required high speed, costs are further increased. Furthermore, the 3D display system 100 requires a complex structure occupying a relatively large space.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
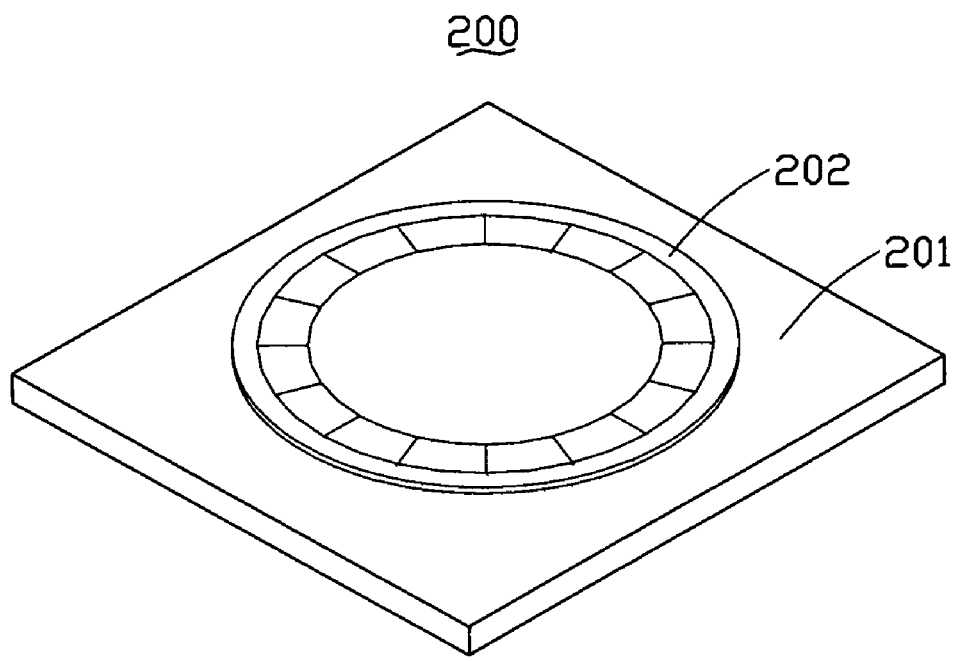
FIG. 1 is an isometric view of a first embodiment of a 3D display device including a flat panel display and a light regulating sheet.

Referring to FIG. 1, a first embodiment of a three-dimensional (3D) display device 200 includes a flat panel display 201 and a light regulating sheet 202 positioned on the flat panel display 201. The flat panel display 201 may be a liquid crystal display, an organic light emitting diode display, a cathode ray tube display, a light emitting diode array display, or another kind of display.

Figure 2:
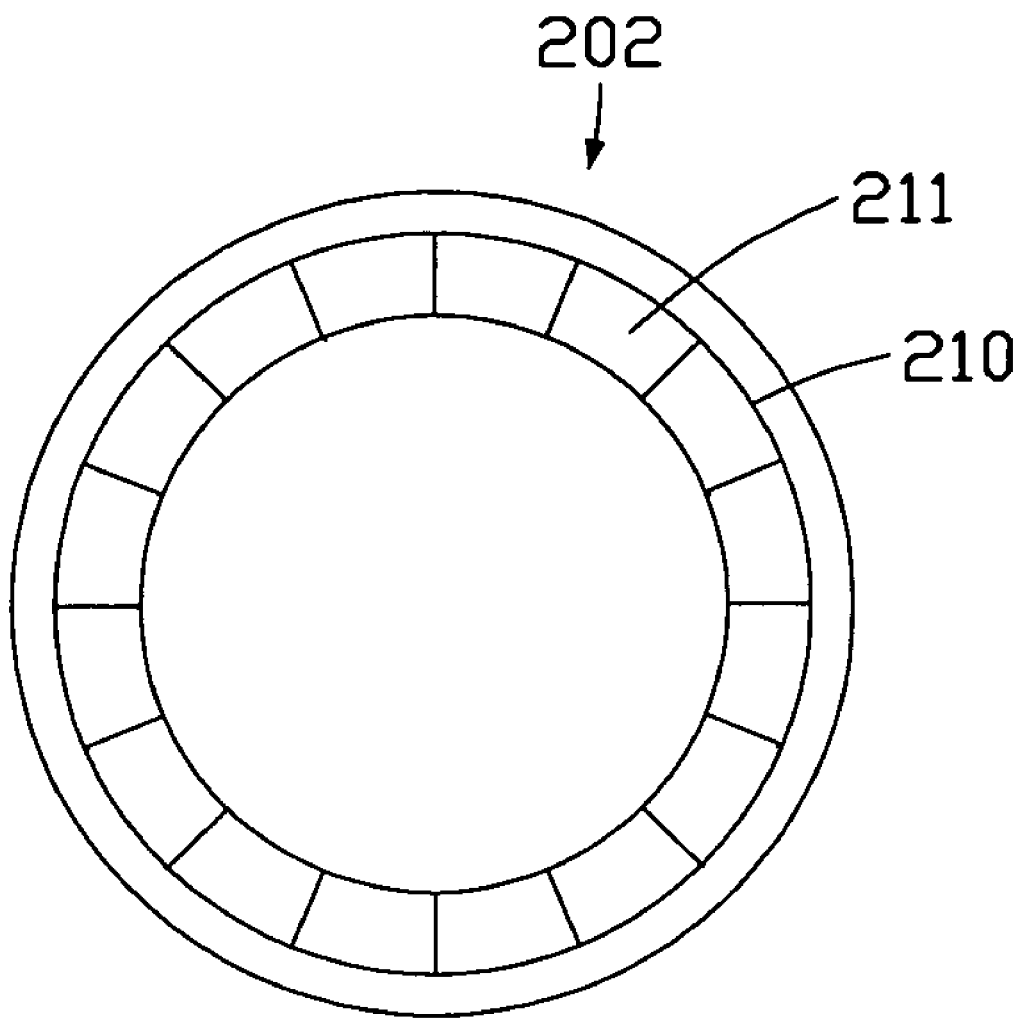
FIG. 2 is a plan view of the light regulating sheet of FIG. 1.

Referring to FIG. 2, the light regulating sheet 202 is substantially circular and includes a light regulating ring 210. The light regulating ring 210 is evenly divided into a plurality of light regulating units 211. Each light regulating unit 211 may be substantially fan shaped. That is, each light regulating unit 211 may have the shape of a truncated sector of a circle. The light regulating units 211 all have the same area.

Figure 3:
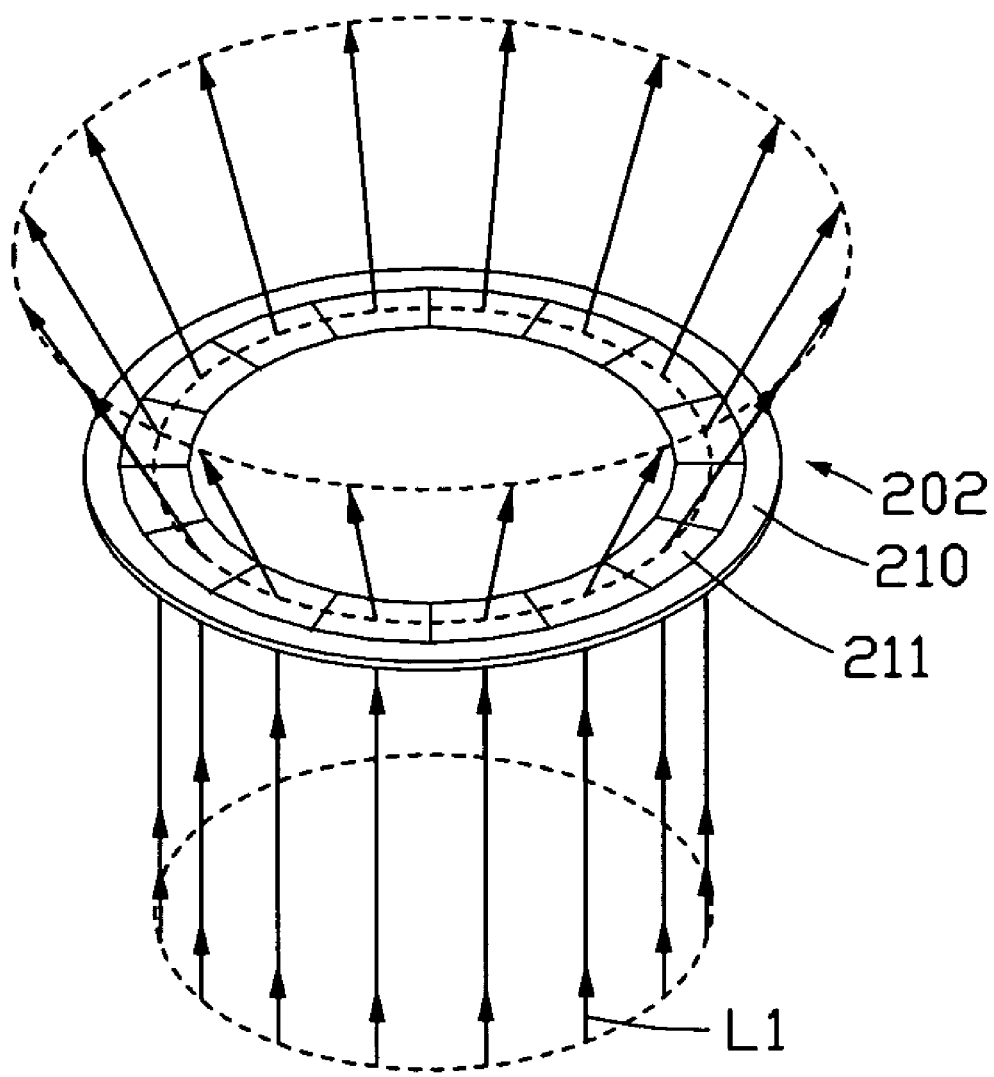
FIGS. 3 and 4 are optical pathway diagrams of the light regulating sheet of FIG. 2.
Figure 4:
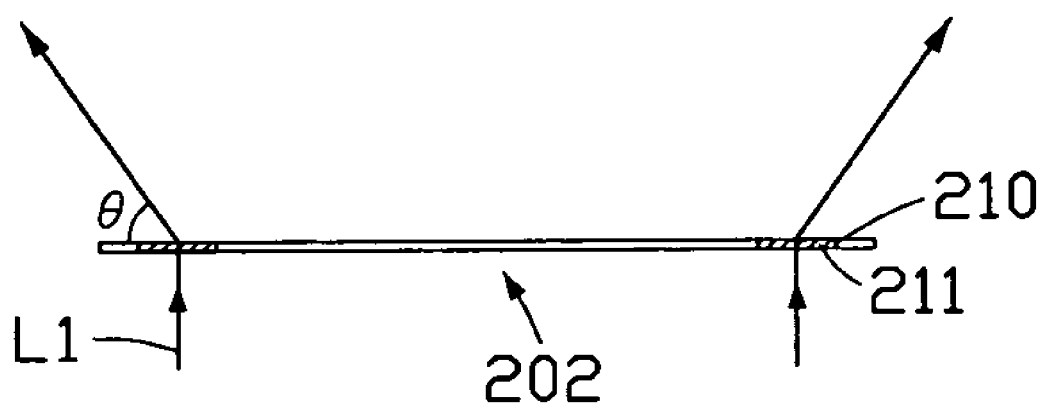

Referring also to FIGS. 3 and 4, the light regulating sheet 202 is capable of regulating input light beams in order to output the light beams at a predetermined angle. A given light beam L1 substantially perpendicularly enters the light regulating sheet 202, is adjusted by the light regulating unit 211, and outputs at a light emitting angle θ, which exceeds 0° but is less than 90°. A plurality of such light beams L1 is arrayed in substantially a cylindrical form, and perpendicularly enters the light regulating sheet 202. Each light beam L1 passes through the geometric center of each light regulating unit 211, and is adjusted by the corresponding light regulating unit 211. The plurality of light beams L1 is thus output as a radially expanding composite light beam, in the form of a substantially frustoconical shaped composite light beam. The light regulating sheet 202 may be an achromatic optical diffraction element, such as a Fresnel lens that is made by laser interference. Each light regulating unit 211 may be a laser holographic Fresnel diffraction unit or a view-angle-limiting filter-attached screen, as disclosed in U.S. Pat. No. 7,059,729, the contents of which are incorporated herein by reference. Each light regulating unit 211 limits a set range of viewing angles.

Figure 5:
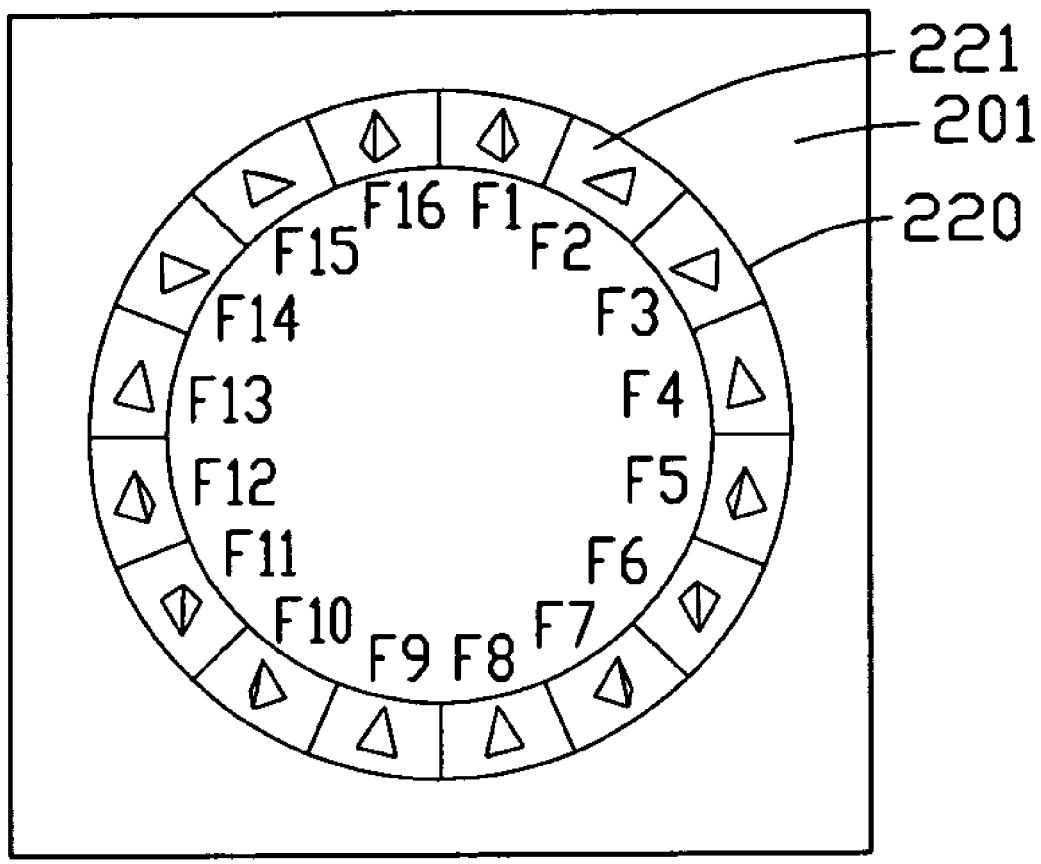
FIG. 5 is a plan view of the flat panel display of FIG. 1 simultaneously displaying different images of the one same object (which is a tetrahedron).
Figure 6:
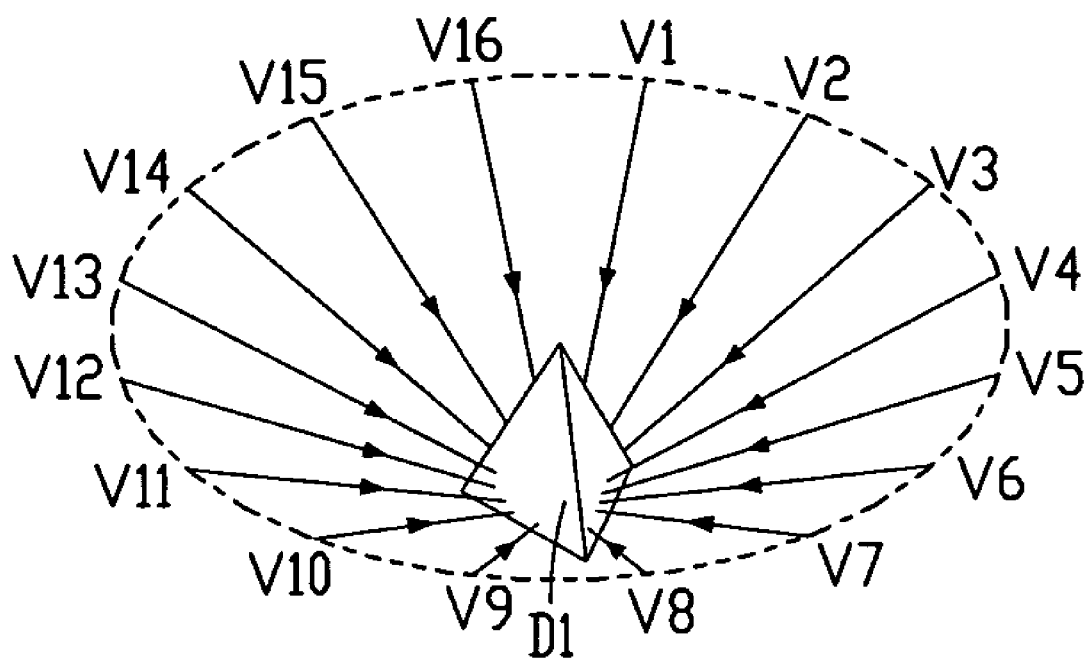
FIG. 6 is an isometric view showing all predetermined viewing angle positions used for capturing the different images that are subsequently displayed as shown in FIG. 5.

Referring also to FIGS. 5 and 6, the flat panel display 201 includes a display ring 220 corresponding to the light regulating ring 210. The display ring 220 is evenly divided into a plurality of display units 221 corresponding to the plurality of light regulating units 211. Each display unit 221 has the same shape and the same area as each light regulating unit 211. Each display unit 221 displays a two-dimensional (2D) image of an object D1. In the illustrations, the object is a tetrahedron; in particular, a pyramid having four triangular sides including the bottom side. In this embodiment, the flat panel display 201 includes sixteen display units 221 and displays sixteen images F1-F16 simultaneously. The images F1-F16 are arrayed clockwise and represent all predetermined viewing angle images of the object D1. FIG. 6 shows all the viewing angle positions V1-V16 for capturing the images F1-F16, respectively. The viewing angle positions V1-V16 are arrayed clockwise, and every two adjacent viewing angle positions form the same angle therebetween. The images F1-F16 are obtained by capturing images of the object D1 from the viewing angle positions V1-V16, respectively.

Figure 7:
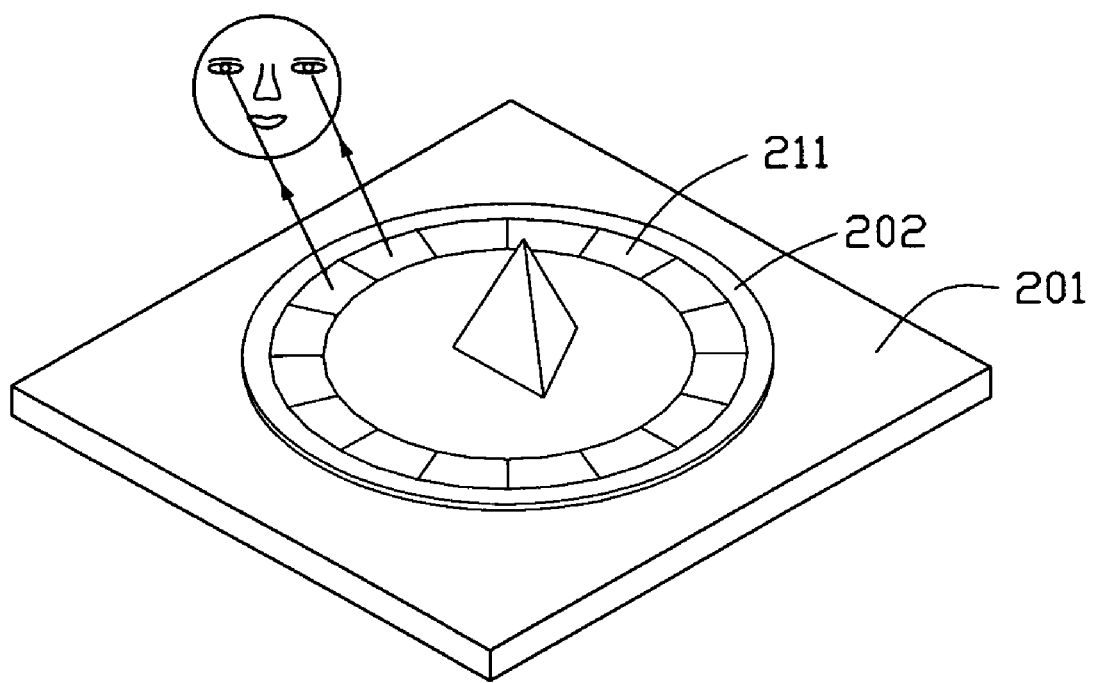
FIG. 7 is an isometric view of the 3D display device of FIG. 1 in operation.

Referring also to FIG. 7, the light beams emitted from the flat panel display 201 are regulated by the light regulating sheet 202 and then viewed by a user from a predetermined viewing angle range. If the left eye and right eye of the viewer simultaneously see different images respectively, a 3D image will be perceived by the viewer. This is the basic principle of holography, as used with 3D movies which require 3D polarizing glasses.

When the flat panel display 201 is viewed from a position forming an angle with the flat panel display 201 equal to the light emitting angle θ, an exemplary light beam (as shown) passes through one light regulating unit 211 to enable the image F1 (for example) to be seen by the right eye of the viewer and another exemplary light beam (as shown) passes through another adjacent light regulating unit 211 to enable the image F2 (for example) to be seen by the left eye of the viewer. The combination of the two images F1, F2 simultaneously seen by the viewer present a 3D image of the object D1 as perceived by the viewer, with different 3D images of the object D1 being viewable in a 360° range of viewing positions of the user.

Unlike other conventional 3D display systems, the 3D display device 200 requires no use of a costly projector, projection screen and driving motor. Accordingly, the 3D display device 200 can present 3D images at lower cost and with lower power consumption. In addition, the 3D display device 200 has a simple structure, requiring considerably less space to operate.

Figure 8:
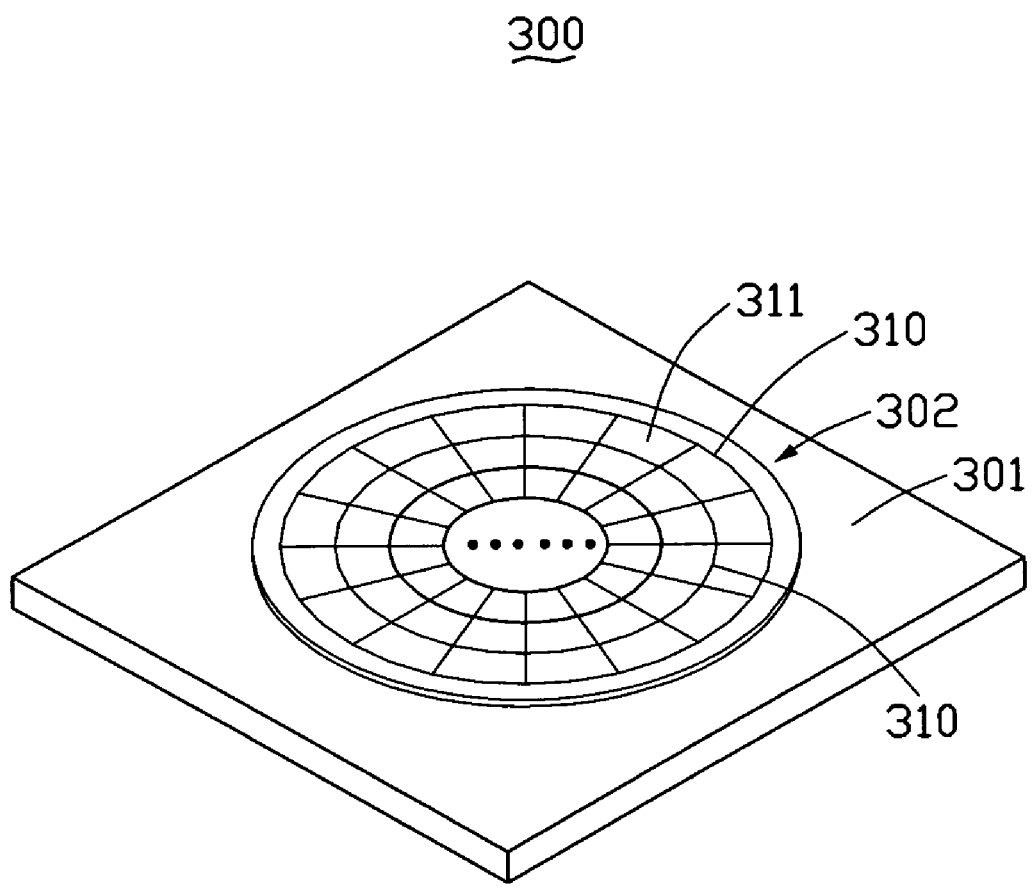
FIG. 8 is an isometric view of a second embodiment of a 3D display device including a flat panel display and a light regulating sheet.

Referring to FIG. 8, a second embodiment of a 3D display device 300 is shown. The 3D display device 300 differs from the 3D display device 200 only in that a light regulating sheet 302 includes a plurality of concentric light regulating rings 310. Each light regulating ring 310 is divided into a plurality of light regulating units 311, each capable of regulating input light beams in order to output the light beams at a predetermined angle. The light regulating units 311 of any one same light regulating ring 310 output light beams at the same angle. The light regulating units 311 of different light regulating rings 310 output light beams at different angles.

Figure 9:
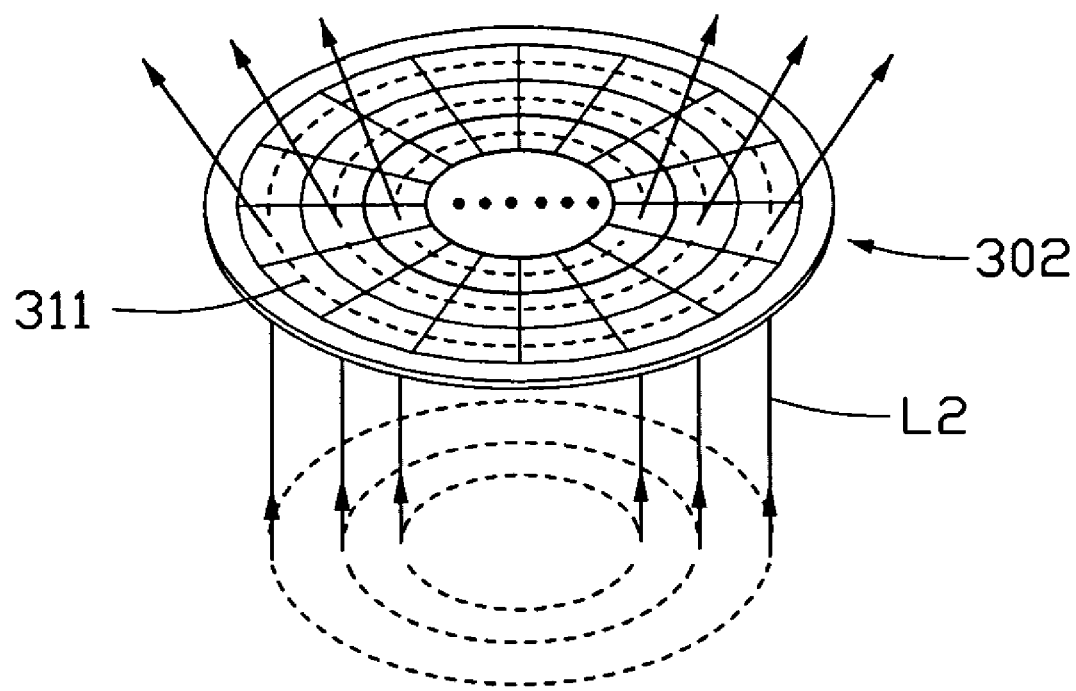
FIGS. 9 and 10 are optical pathway diagrams of the light regulating sheet of FIG. 8.
Figure 10:
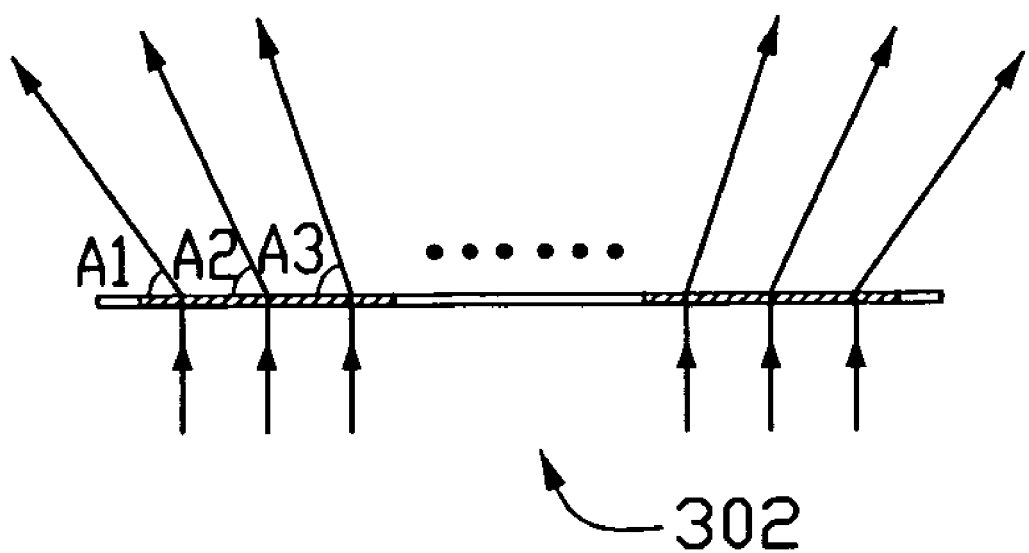

Referring also to FIGS. 9 and 10, a plurality of light beams L2 enters the light regulating sheet 302 perpendicularly. Each light beam L2 passes through a geometric center of a corresponding light regulating unit 311, and is adjusted by the corresponding light regulating unit 311. The plurality of light beams L2 passing through the different light regulating rings 310 is thus output as a radially expanding composite light beam. The composite light beam includes component output light beams with different light emitting angles A1, A2, A3 . . . , as shown in FIG. 10. The light emitting angles A1, A2, A3 . . . each exceed 0°, but are less than 90°. In regard to any two of the light emitting angles A1, A2, A3 . . . , the inner one of the light emitting angles A1, A2, A3 . . . exceeds the outer one of the light emitting angles A1, A2, A3 . . . . The parallel light beams L2 entering any one same light regulating unit 311 are output parallel to each other at the same angle.

Figure 11:
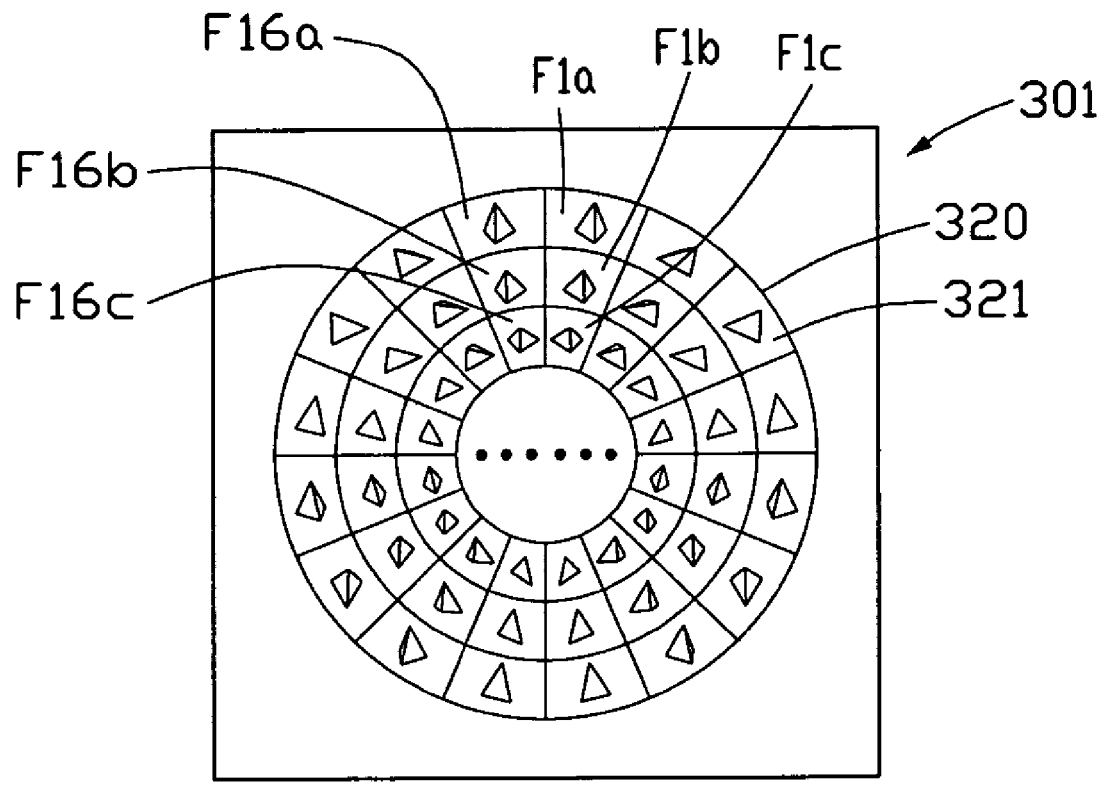
FIG. 11 is a plan view of the flat panel display of FIG. 8 simultaneously displaying different images of the one same object (which is a tetrahedron).
Figure 12:
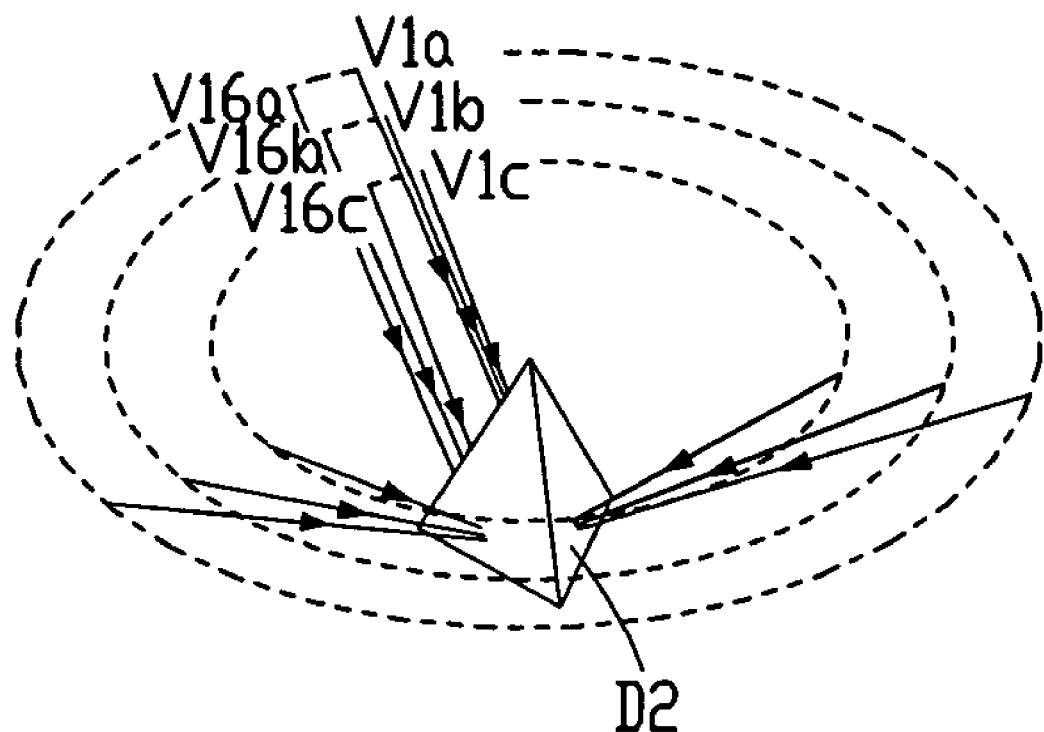
FIG. 12 is an isometric view showing all predetermined viewing angle positions used for capturing the different images that are subsequently displayed as shown in FIG. 11.

Referring also to FIGS. 11 and 12, a flat panel display 301 includes a plurality of display rings 320 corresponding to the light regulating rings 310. Each display ring 320 is divided into a plurality of display units 321 corresponding to the light regulating units 311. The plurality of display units 321 displays all viewing angle images F1a-F16a, F1b-F16b and F1c-F16c . . . of an object D2 (e.g., a tetrahedron). FIG. 12 shows all the viewing angle positions V1a-V16a, V1b-V16b and V1c-V16c . . . for capturing the images F1a-F16a, F1b-F16b and F1c-F16c . . . . Each set of the images F1a-F16a, F1b-F16b and F1c-F16c . . . is arrayed clockwise, and corresponds to the respective set of viewing angle positions V1a-V16a, V1b-V16b and V1c-V16c. An angle (not shown) defined between each of the viewing angle positions V1a-V16a and the horizontal is equal to the light emitting angle A1. An angle (not shown) defined between each of the viewing angle positions V1b-V16b and the horizontal is equal to light emitting angle A2. An angle (not shown) defined between each of the viewing angle positions V1c-V16c and the horizontal is equal to the light emitting angle A3.

Figure 13:
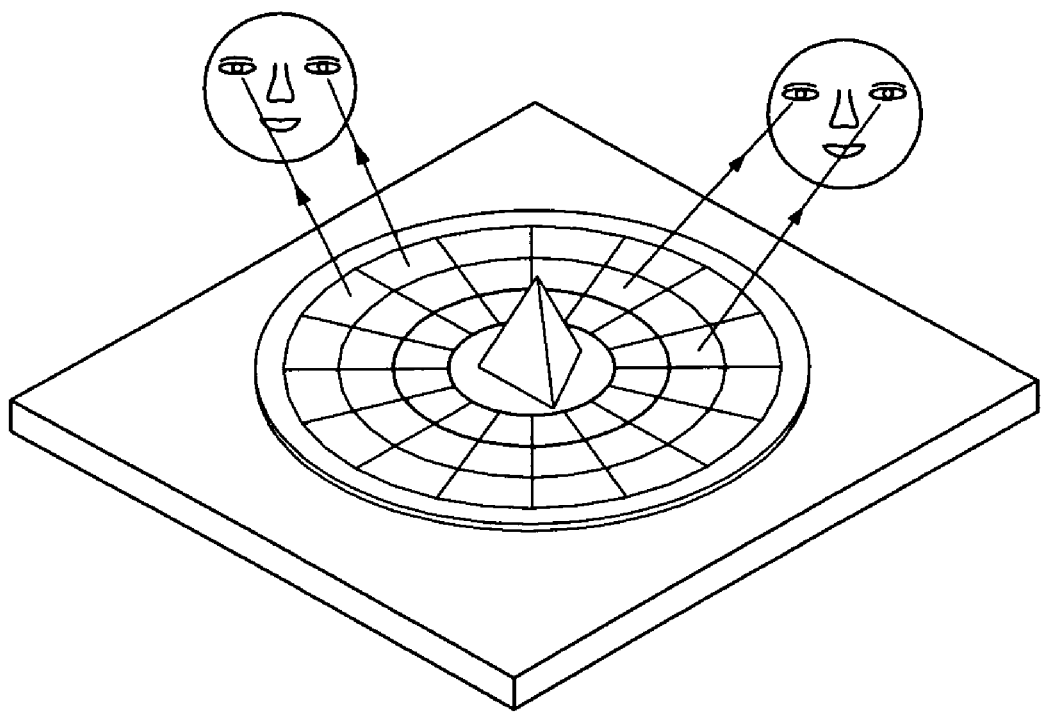
FIG. 13 is an isometric view of the 3D display device of FIG. 8 in operation.
Figure 14:
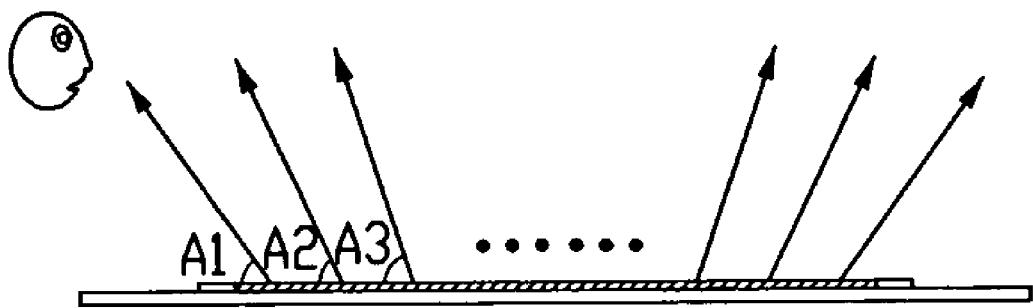
FIG. 14 is an optical pathway diagram of the light regulating sheet of FIG. 8.

Referring also to FIGS. 13 and 14, when the flat panel display 301 is viewed from a position forming an angle equal to the light emitting angle A1, A2 or A3 with the flat panel display 301, a 3D image of the object D2 is perceived by a viewer, with different 3D images of the object D2 being viewable in a 360° range of viewing positions of the user. Using the 3D display device 300, the viewer can observe 3D images of the object D2 from more viewing angle positions than when using the 3D display device 200.

In the 3D display device 300, each light beam emitted from any light regulating unit 311 is divergent. The left and right eyes of the viewer can simultaneously see different images displayed on different light regulating units 311 respectively, thereby perceiving a 3D image. However, when the viewer is some distance away from the 3D display device 300, the left and right eyes of the viewer do not receive different light beams from the different light regulating units 311 respectively, due to the divergence of these light beams. In such case, the viewer only perceives a 2D image. That is, the 3D image is only provided at positions close to the 3D display device 300. When the viewer is located close to the 3D display device 300, the focus (not shown) of the diverged light beams viewed is located below the flat panel display 301. The 3D image viewed appears to the viewer as being embedded in the 3D display device 300.

Figure 15:
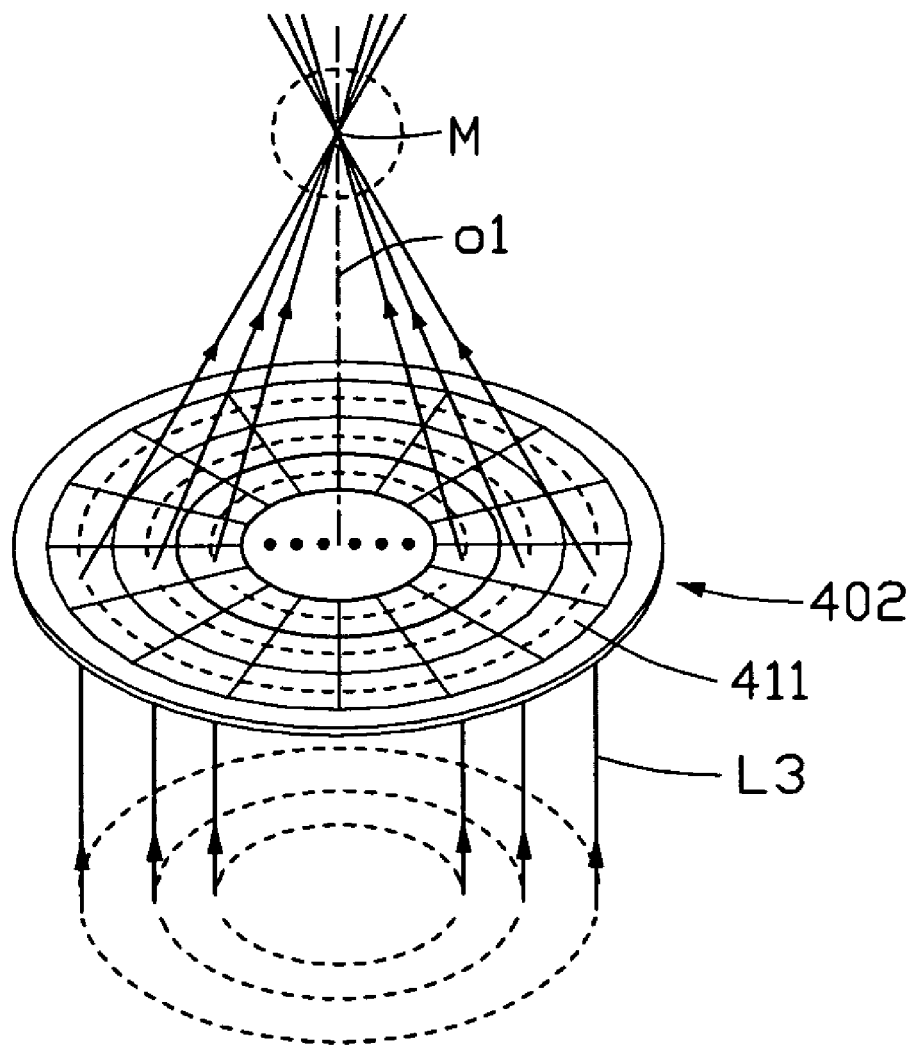
FIG. 15 is an isometric view of a third embodiment of a 3D display device including a flat panel display and a light regulating sheet, showing optical pathways of the light regulating sheet.
Figure 16:
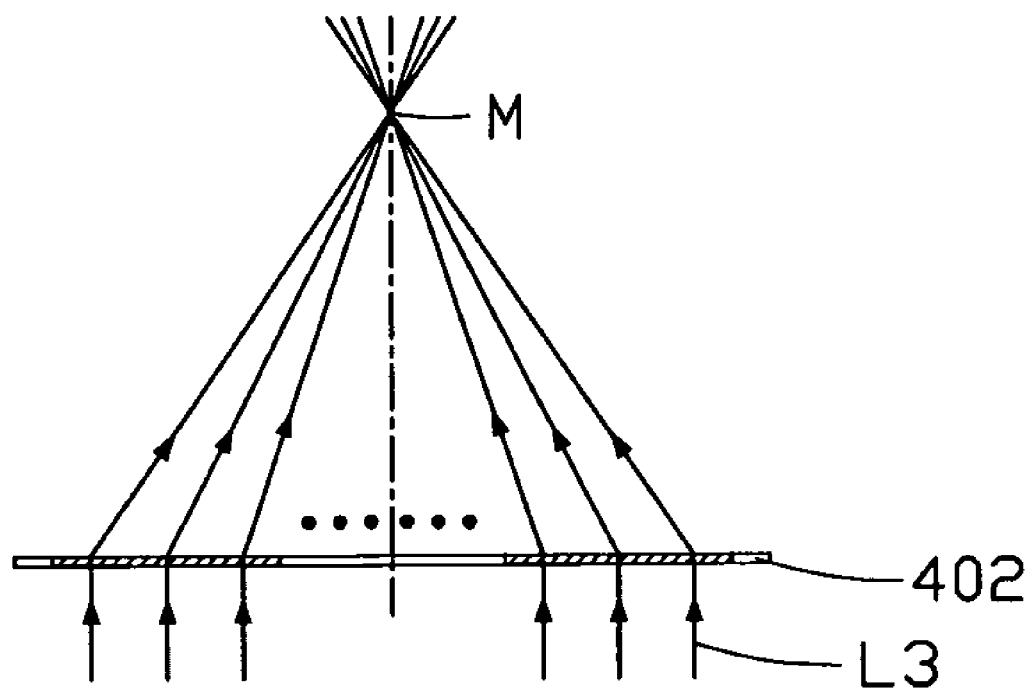
FIG. 16 is an optical pathway diagram of the light regulating sheet of the 3D display device of FIG. 15.

Referring to FIGS. 15 and 16, a third embodiment of a 3D display device 400 is provided. The 3D display device 400 is provided to address the issue of 3D images being available only at positions close to the display device 300. The 3D display device 400 differs from the 3D display device 300 only in the light regulating directions of a light regulating sheet 402. A plurality of light beams L3 perpendicularly enters the light regulating sheet 402, each passing through a geometric center of a respective one of a plurality of light regulating units 411. The light beams L3 are adjusted by the corresponding light regulating units 411, and then output convergently to converge at a focus M. The focus M is located on a central optical axis o1 of the light regulating sheet 402, above the light regulating sheet 402. Parallel light beams L3 entering any one same light regulating unit 411 are output parallel to each other at the same angle.

Figure 17:
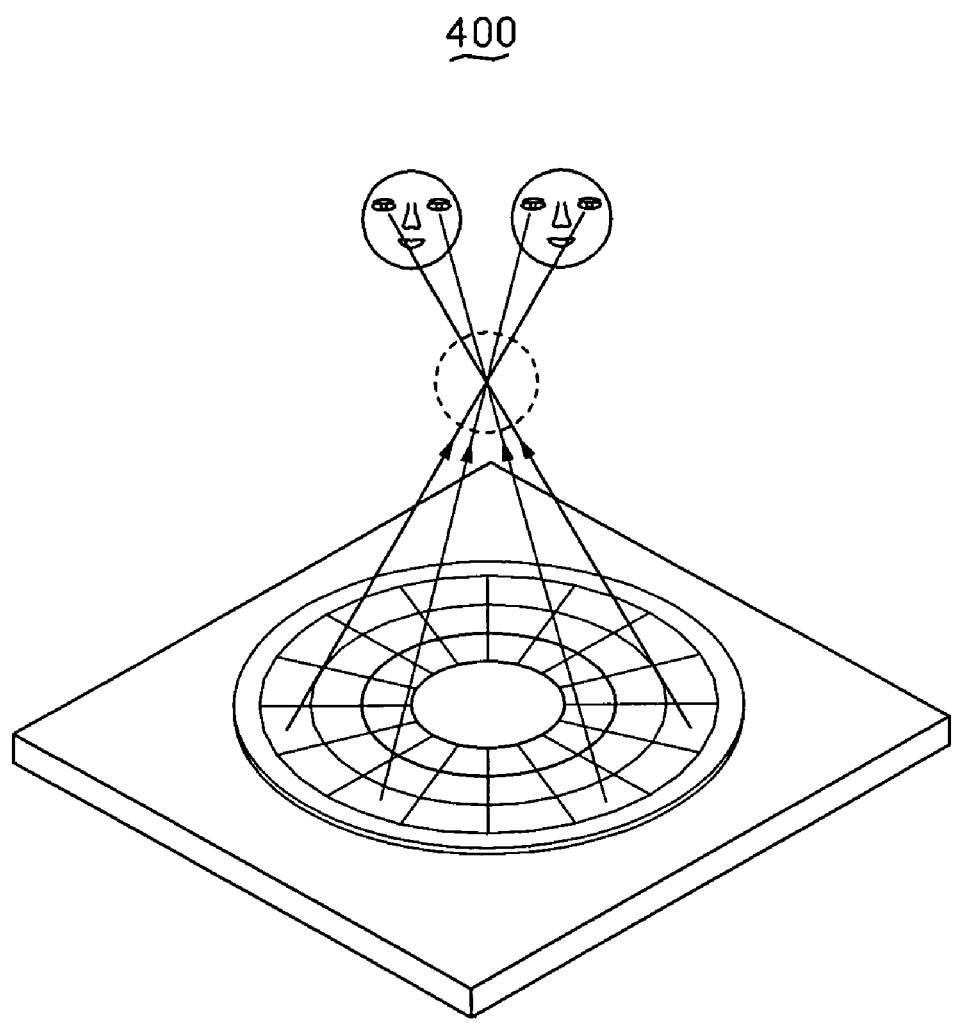
FIGS. 17 and 18 are isometric views of the 3D display device of FIG. 15 in operation.
Figure 18:
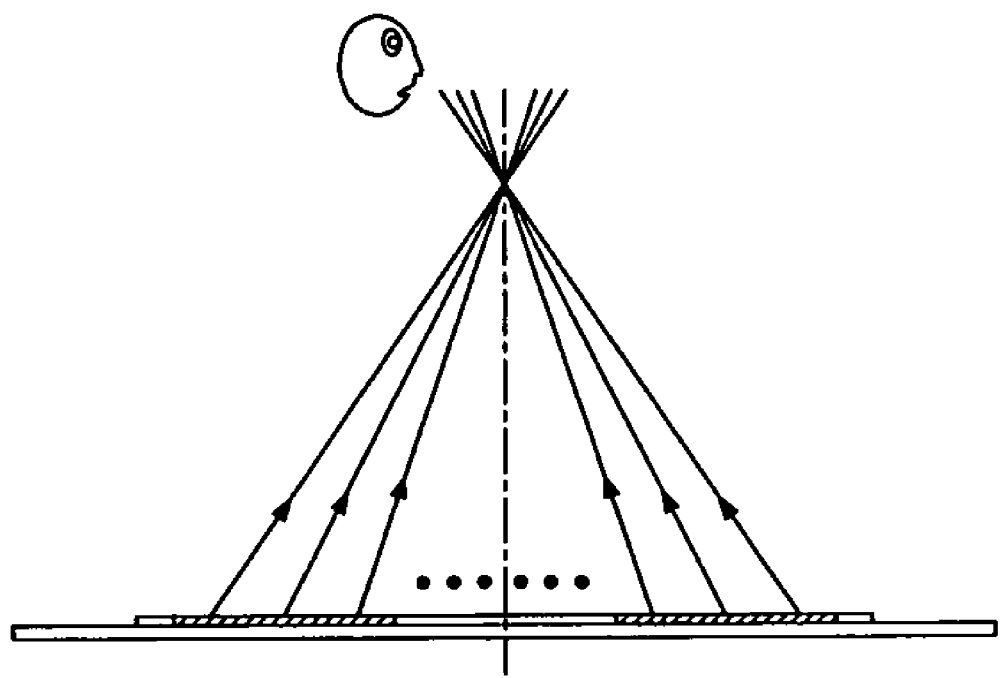

Referring also to FIG. 17, the light beams passing through the focus M continue to propagate beyond (above) the focus M as a radially expanding composite light beam. When the flat panel display 401 is viewed from above the focus M, a 3D image is perceived by a viewer. Using the 3D display device 400, the 3D image can be viewed from positions farther away from the 3D display device 400 than is the case when using the 3D display device 300. In addition, the focus of the converging light beams viewed is located above the flat panel display 401, which provides a 3D image perceived as being located a certain distance above the 3D display device 300.

In all the above-described 3D display devices 200, 300 and 400, the display of 3D images is subject to space constraints. In the 3D display device 200, for example, the light regulating ring 210 need only be divided into no more than about thirty light regulating units 211, due to the limitations of the space occupied by the light regulating ring 210. If the light regulating ring 210 is divided into more than about thirty light regulating units 211, each light regulating unit 211 has a very small area, thus introducing a reduction of image resolution. If the number of light regulating units 211 is too low, image resolution is improved, but the quality of the 3D image is reduced.

Figure 19:
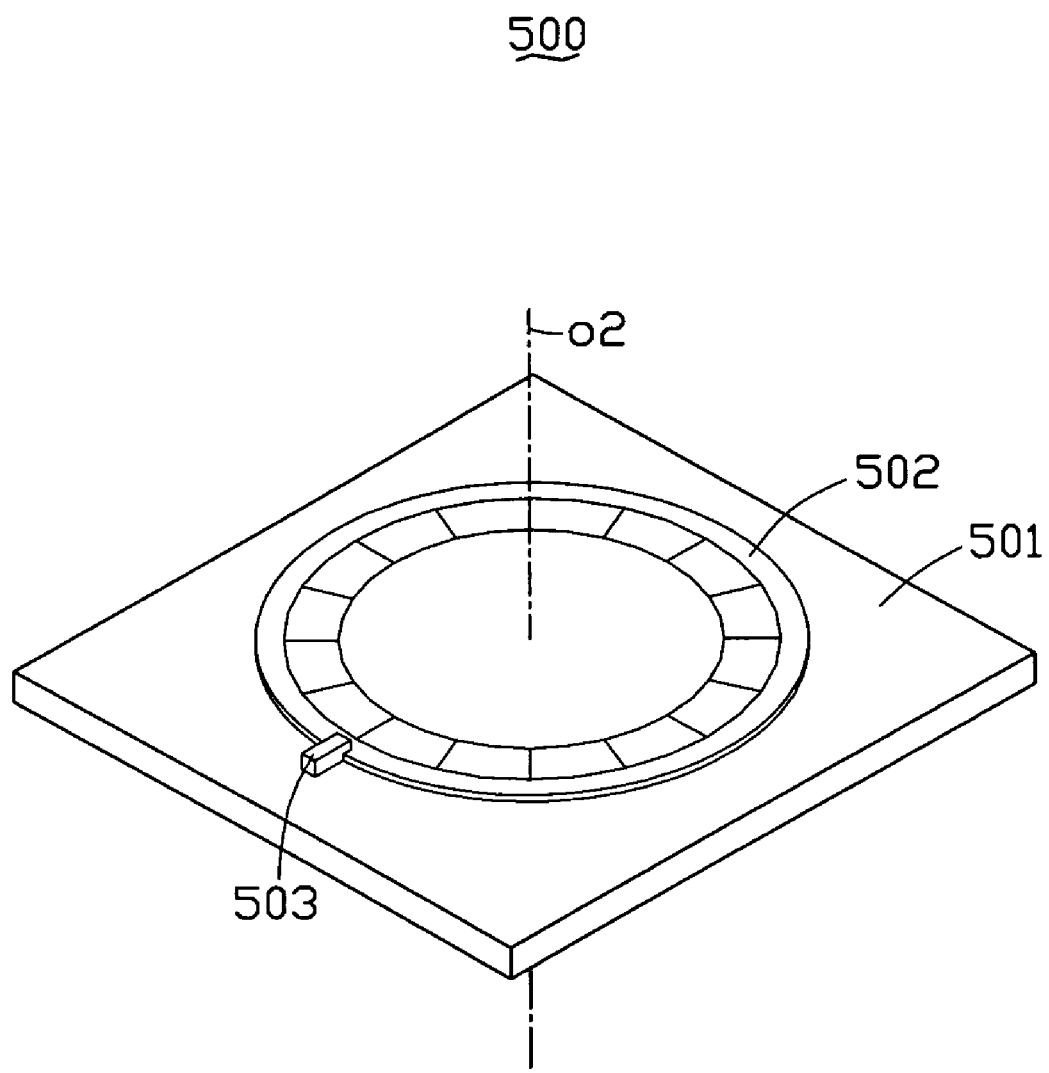
FIG. 19 is an isometric view of a fourth embodiment of a 3D display device including a light regulating sheet.

Referring also to FIG. 19, in order to address the above-described issues, a fourth embodiment of a 3D display device 500 is provided. The 3D display device 500 differs from the 3D display device 200 by using persistence of vision during the time period in which a plurality of groups of images are batch displayed in different positions. In other words, the time period of persistence of vision is divided into two or more display time periods, with each group of images displayed in each display time period respectively. As perceived by a viewer, all the images appear simultaneously, because the human eye cannot distinguish changes in an image that occur at a frequency above a certain threshold frequency. Thus more images can be sensed by the viewer without reducing the image resolution, so that the stereoscopic experience of the 3D image is superior.

The 3D display device 500 includes a rotating module 503, which is positioned on a light emitting surface of a flat panel display 501 around an edge of a light regulating sheet 502. The rotating module 503 rotates the light regulating sheet 502 around a central optical axis o2 of the light regulating sheet 502. The rotating module 503 may be a micro-motor or another kind of micro-driving module.

Figure 20:
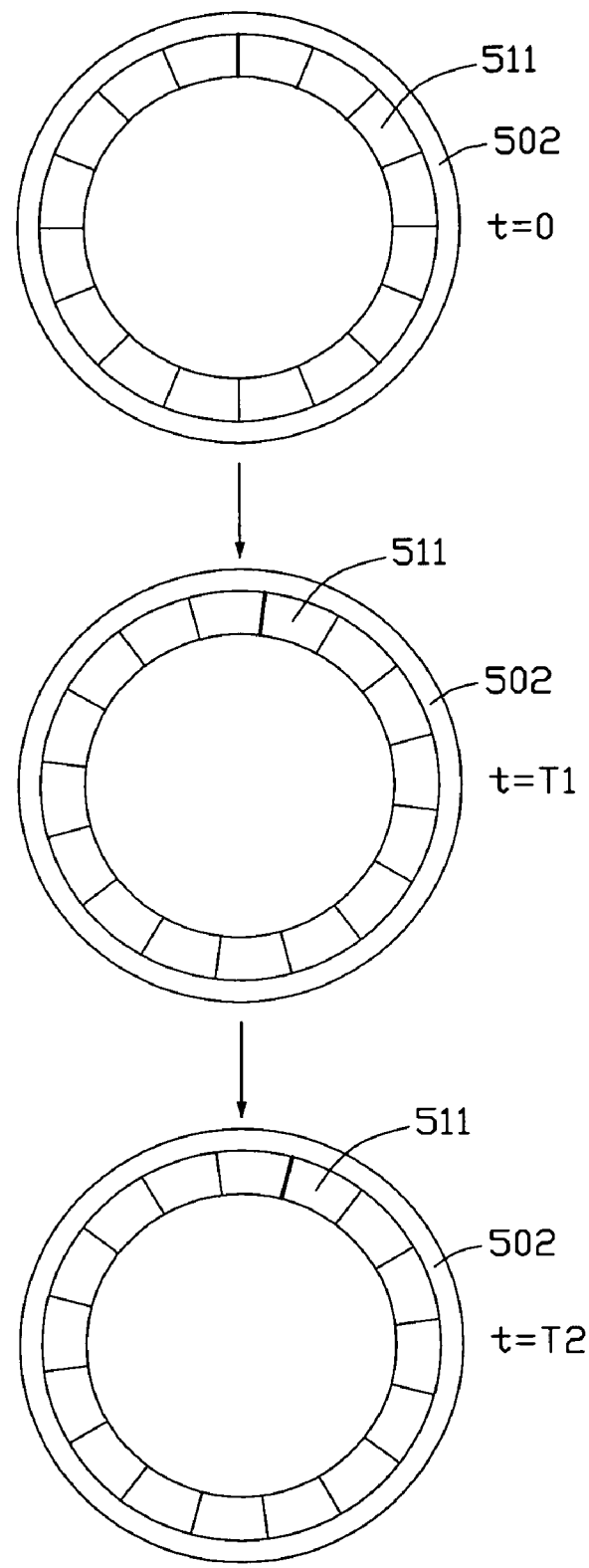
FIG. 20 shows plan views of the light regulating sheet of FIG. 19 in different working states at different times.

Referring also to FIG. 20, a time period T is divided into three time periods 0-T1, T1-T2 and T2-T. The time period T is equal to or shorter than the time period of persistence of vision. In the time periods 0-T1, T1-T2 and T2-T, three groups of images are displayed, respectively.

Figure 21:
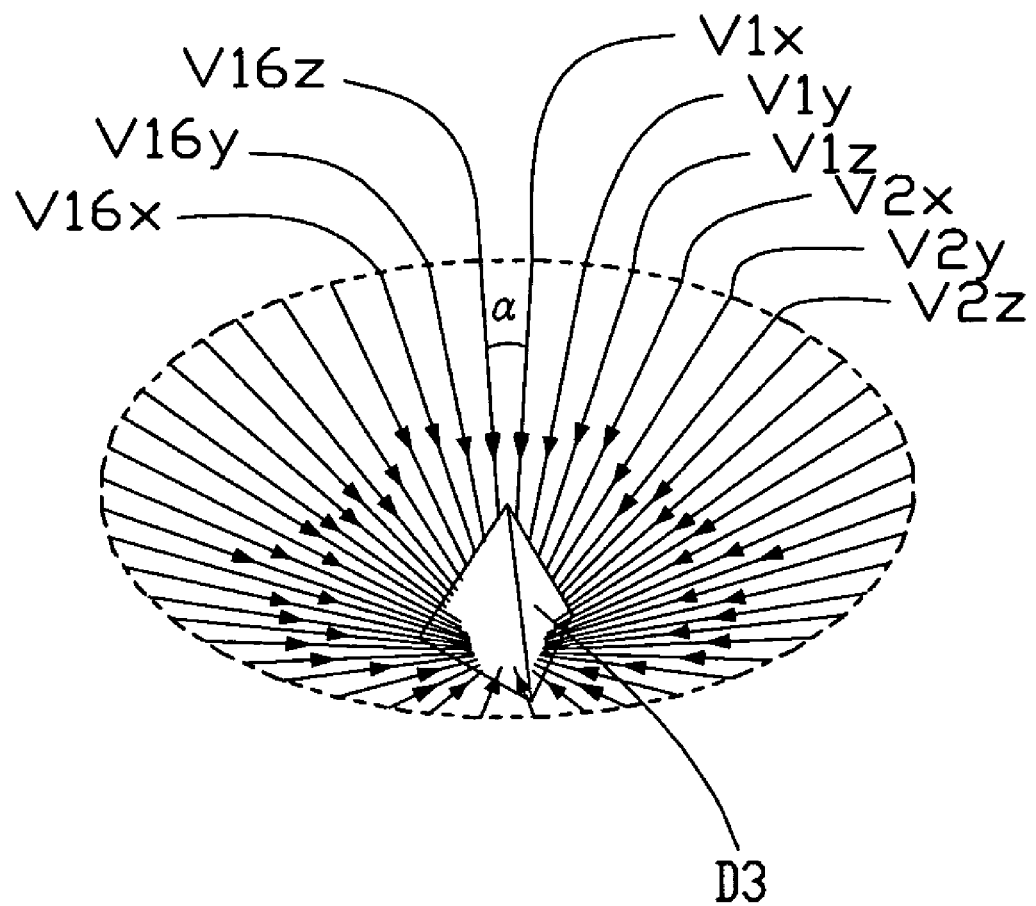
FIG. 21 is an isometric view showing all predetermined viewing angle positions used for capturing the different images of an object that are subsequently displayed by the 3D display device of FIG. 19.
Figure 22:
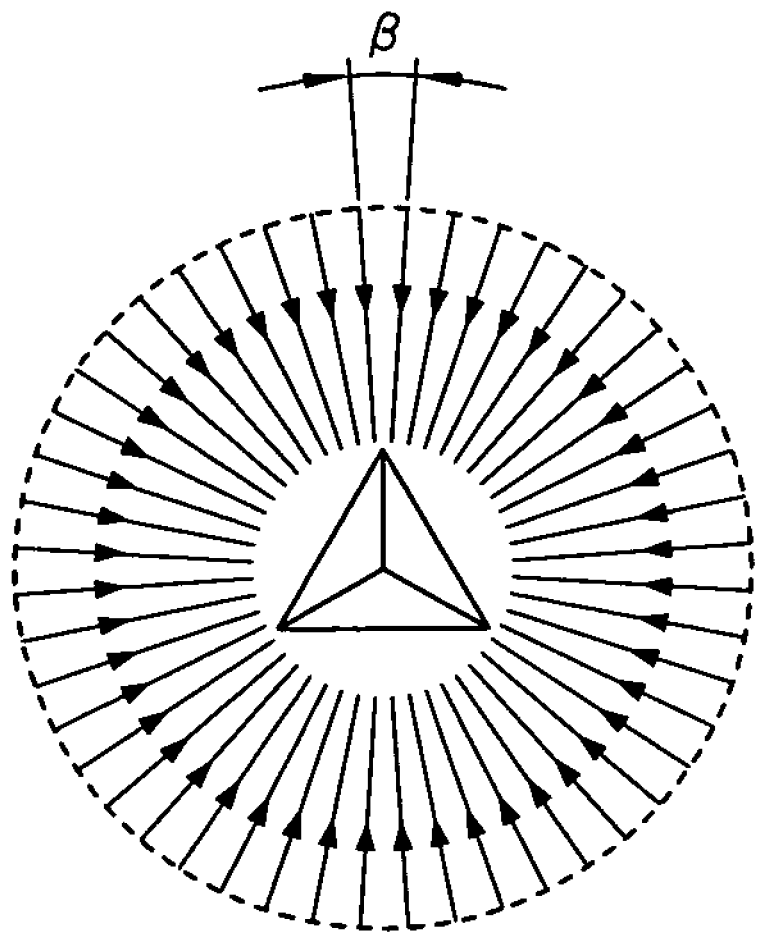
FIG. 22 is a top plan view of FIG. 21.
Figure 23:
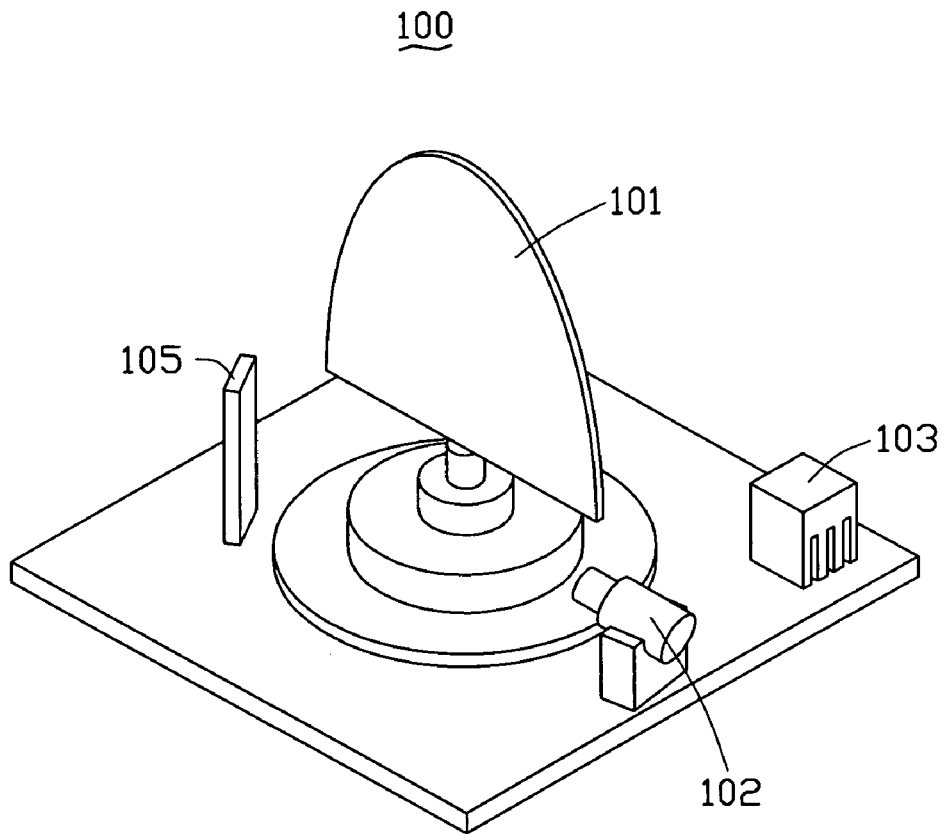
FIG. 23 is an isometric view of a commonly used 3D display system.

Referring also to FIGS. 21 and 22, forty-eight viewing angle positions V1x, V1y, V1z, V2x, V2y, V2z ... V16x, V16y, V16z for observing an object D3 are shown. The viewing angle positions V1x, V1y, V1z, V2x, V2y, V2z ... V16x, V16y, V16z are arrayed clockwise. Each viewing angle position V1x, V16z defines a viewing angle line extending from a geometric center of the object D3. Each two adjacent viewing angle lines define an angle α therebetween. The projection of the angle α on the flat panel display 501 is defined as an angle β, wherein the angle β is 7.5°. The viewing angle positions V1x, V1y, V1z, V2x, V2y, V2z ... V16x, V16y, V16z are divided into three groups V1x-V16x, V1y-V16y and V1z-V16z. When the object D3 is photographed from the viewing angle positions V1x-V16x, a first group of images can be obtained. When the object D3 is photographed from the viewing angle positions V1y-V16y, a second group of images can be obtained. When the object D3 is photographed from the viewing angle positions V1z-V16z, a third group of images can be obtained.

In the time period 0-T1, the first group of images is displayed on the flat panel display 501 and are viewable via regulating of the light regulating units 511. In the time period T1-T2, the light regulating sheet 502 is rotated 7.5° by the rotating module 503 around the central axis o2 and then stopped in position. The second group of images is then immediately displayed on the flat panel display 501 and is viewable via regulating of the light regulating units 511. In the time period T2-T, the light regulating sheet 502 is rotated 7.5° again by the rotating module 503 around the central axis o2 and then stopped in position. The third group of images is then immediately displayed on the flat panel display 501 and is viewable via regulating of the light regulating units 511. The image switching time of the flat panel display 501 from one time period to the next is very short, and due to the persistence of vision, the first, second and third groups of images appear to the viewer to be displayed simultaneously. Thus, the 3D display device 500 not only provides high image resolution, but also a superior stereoscopic experience of the 3D image viewed.

In alternative embodiments, the light regulating sheet 502 can continuously rotate around the central axis o2 with an angular velocity, here, of $(22.5/T)°$ per second, where T1 is equal to $\frac{1}{3}T$ and T2 is equal to $\frac{2}{3}T$.

It is believed that the present embodiments and their advantages will be understood from the foregoing description, and it will be apparent that various changes may be made thereto without departing from the spirit and scope of the disclosure or sacrificing all of its material advantages.

What is claimed is:

1. A three-dimensional display device, comprising:
a flat panel display; and
a light regulating sheet positioned on the flat panel display, wherein light beams emitted from the flat panel display and input to the light regulating sheet are adjusted by the light regulating sheet and output from by the light regulating sheet at predetermined angles relative to their input angles;
wherein the light regulating sheet comprises a light regulating ring divided into a plurality of light regulating units; the flat panel display comprises a plurality of display units corresponding to the plurality of light regulating units; and wherein each display unit displays a two-dimensional image of an object viewed from a predetermined viewing angle position, each light regulating unit limits the two-dimensional image to within a viewing angle range corresponding to the predetermined viewing angle position, and the two-dimensional images of the object displayed in the display units are different from each other.

2. The three-dimensional display device of claim 1, wherein the light regulating ring adjusts the input light beams to be output as a radially expanding composite light beam, which is in the form of a substantially frustoconical shaped composite light beam.

3. The three-dimensional display device of claim 1, wherein each display unit has the same shape and the same area as each light regulating unit.

4. The three-dimensional display device of claim 1, wherein the flat panel display is selected from the group consisting of a liquid crystal display, an organic light emitting diode display, a cathode ray tube display, and a light emitting diode array display.

5. The three-dimensional display device of claim 1, wherein the light regulating sheet is a Fresnel lens made by laser interference, and each light regulating unit is a laser holographic Fresnel diffraction unit.

6. The three-dimensional display device of claim 1, wherein the light regulating ring adjusts the input light beams to be output convergently and converge at a focus, wherein the focus is on a central optical axis of the light regulating sheet above the light regulating sheet.

7. A three-dimensional display device, comprising:
a flat panel display; and
a light regulating sheet positioned on the flat panel display, wherein light beams emitted from the flat panel display and input to the light regulating sheet are adjusted by the light regulating sheet and output from by the light regulating sheet at predetermined angles relative to their input angles;
wherein the light regulating sheet comprises a plurality of concentric light regulating rings, each light regulating ring is divided into a plurality of light regulating units; and wherein the flat panel display comprises a plurality of display units corresponding to the plurality of light regulating units; each display unit displaying a two-dimensional image of an object viewed from a predetermined viewing angle position, each light regulating unit limiting the two-dimensional image to within a viewing angle range corresponding to the predetermined viewing angle position, and the two-dimensional images of an object displayed in the display units are different from each other.

8. The three-dimensional display device of claim 7, wherein the light regulating units positioned in each one same light regulating ring adjust the corresponding input light beams to be output at the same light emitting angle, and the light regulating units positioned in different light regulating rings adjust the corresponding input light beams to be output at different light emitting angles.

9. The three-dimensional display device of claim 8, wherein the light emitting angles of the output light beams increase from an outmost one of the light regulating rings to an inmost one of the light regulating rings.

10. The three-dimensional display device of claim 8, wherein parallel input light beams entering each one same light regulating unit are output parallel to each other at the same light emitting angle.

11. The three-dimensional display device of claim 7, wherein the plurality of concentric light regulating rings adjust the input light beams to be output as a radially expanding composite light beam, which is in the form of a substantially frustoconical shaped composite light beam.

12. The three-dimensional display device of claim 7, wherein the plurality of concentric light regulating rings adjust the input light beams to be output convergently and converge at a focus, wherein the focus is on a central optical axis of the light regulating sheet above.

13. The three-dimensional display device of claim 7, wherein each display unit has the same shape and the same area as each light regulating unit.

14. A three-dimensional display device, comprising:
a flat panel display;
a light regulating sheet positioned on the flat panel display, wherein light beams emitted from the flat panel display and input to the light regulating sheet are adjusted by the light regulating sheet and output from the light regulating sheet at predetermined angles relative to their input angles; and
a rotating module positioned on the light regulating sheet and configured for rotating the light regulating sheet around a central axis of the light regulating sheet;
wherein the light regulating sheet comprises at least one light regulating ring divided into a plurality of light regulating units, the flat panel display comprises a plurality of display units corresponding to the plurality of light regulating units, each display unit displays a two-dimensional image of an object viewed from a predetermined viewing angle position, each light regulating unit limits the two-dimensional image to within a viewing angle range corresponding to the predetermined viewing angle position, and the two-dimensional images of the object displayed in the display units are different, from each other; and
wherein the two-dimensional images of the object comprise a plurality of groups of two-dimensional images, each group of two-dimensional images comprises images taken from a plurality of equally angularly spaced positions surrounding the object, the angular spacing of the positions of each group of two-dimensional images being the same as the angular spacing of the positions of each other group of two-dimensional images, the positions of each group of two-dimensional images being different from the positions of each other group of two-dimensional images, the positions of each group of two-dimensional images being offset a predetermined angle from the corresponding positions of an adjacent group of two-dimensional images; and
wherein the rotating module is configured to rotate the light regulating sheet through a plurality of same predetermined angles within a predetermined period of time, such that upon completion of each such rotation, a next successive group of two-dimensional images is displayed by the display unit, and in the predetermined period of time all the groups of two-dimensional images are displayed by the display unit and all the images of all the groups of two-dimensional images are perceived by a human viewer as having been displayed simultaneously.

15. The three-dimensional display device of claim 14, wherein the light regulating sheet discontinuously rotates around the central axis thereof, and during each rotation of the light regulating sheet, the flat panel display displays a corresponding group of images.

16. The three-dimensional display device of claim 14, wherein the light regulating sheet continuously rotates around the central axis thereof with an angular velocity.

17. The three-dimensional display device of claim 14, wherein the at least one light regulating ring adjusts light beams to be output as a radially expanding composite light beam, which is in the form of a substantially frustoconical shaped composite light beam.

18. The three-dimensional display device of claim 14, wherein the at least one light regulating ring adjusts the input light beams to be output convergently and converge at a focus, wherein the focus is on a central optical axis of the light regulating sheet above.

19. The three-dimensional display device of claim 14, wherein the at least one light regulating ring comprises a plurality of concentric light regulating rings, each divided into a plurality of light regulating units.

20. The three-dimensional display device of claim 19, wherein the light regulating units positioned in each one same light regulating ring adjust the corresponding input light beams to be output at the same light emitting angle, and the light regulating units positioned in different light regulating rings adjust the corresponding input light beams to be output at different light emitting angles.

* * * * *